US006812816B1

(12) United States Patent
Easton

(10) Patent No.: US 6,812,816 B1
(45) Date of Patent: Nov. 2, 2004

(54) ROTARY MULTI-POSITION MAGNETIC DETENT DEVICE

(75) Inventor: David Joseph Easton, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/656,771

(22) Filed: Sep. 5, 2003

(51) Int. Cl.[7] ................................................ H01H 9/00

(52) U.S. Cl. ................... 335/205; 335/207; 324/207.25

(58) Field of Search ................................ 335/205–207; 324/207.11, 207.2, 207.25

(56) References Cited

U.S. PATENT DOCUMENTS

| | | | | |
|---|---|---|---|---|
| 3,601,730 A | * | 8/1971 | Cookerly et al. | 335/306 |
| 3,934,216 A | | 1/1976 | Ward | 335/272 |
| 4,185,260 A | * | 1/1980 | O'Toole | 335/206 |
| 4,539,544 A | | 9/1985 | Rapp | 335/298 |
| 6,424,245 B1 | | 7/2002 | Rector et al. | 335/220 |

OTHER PUBLICATIONS

Group Arnold; The Arnold Engineering Company; "Plastiform Injection Molded Magnets"; pp. 14.1 through 14.27; Dec. 1998.

* cited by examiner

Primary Examiner—Ramon M. Barrera

(57) ABSTRACT

A rotary multi-position magnetic detent device includes an inner member having an outer cylindrical surface and an outer member receiving the inner member. The outer member has an inner cylindrical surface and the outer member rotates relative to the inner member. A plurality of inner magnets are disposed in the outer surface and distributed regularly and peripherally around the outer surface. The inner magnets have radially oriented magnetic poles, and alternate adjacent ones of said inner magnets have alternate radially outwardly directed north and south poles. A plurality of outer magnets are disposed in the inner surface and distributed regularly and peripherally around the inner surface. The outer magnets have radially oriented magnetic poles, and alternate adjacent ones of the outer magnets have alternate radially inwardly directed north and south poles. As the inner and outer members are rotated with respect to each other, the inner and outer magnets generate opposing and attracting forces each other to form a plurality of magnetic detent positions. A magnetic field sensor generates a signal in response to relative rotation of the inner and outer members.

12 Claims, 2 Drawing Sheets

ROTARY MULTI-POSITION MAGNETIC DETENT DEVICE

BACKGROUND

The present invention relates to a rotary multi-position magnetic detent device.

There are control mechanisms with transducers which generate electrical signals and which have mechanical detents. For example, vehicle operator controls commonly use detents to provide the operator with tactile feedback in response to manipulation of the control mechanism. It is desirable for the electrical signals produced by the mechanism to be coordinated with its mechanical feel. However, since mechanical detents are subject to friction and mechanical wear, it is difficult to provide such coordination over the entire life of such a mechanism, without requiring some type of calibration or adjustment at initial assembly and perhaps periodically thereafter.

U.S. Pat. No. 3,934,216 describes a rotary multi-position detent device with a plurality of detent positions defined by magnetic fields established by a rotor and stator with magnets sandwiched therebetween. The magnetic poles of the magnets are oriented axially and the variation in magnetic field is created by radially projecting inner and outer pole pieces. Thus, the radially projecting pole pieces increase the radial dimensions of the device, and the detent effect is limited since it is produced solely by variations in attractive magnetic forces.

SUMMARY

Accordingly, an object of this invention is to provide a compact rotary multiposition magnetic detent device.

A further object of the invention is to provide such a detent device with strong magnetic detents.

These and other objects are achieved by the present invention, wherein a rotary detent device includes an inner member having an outer cylindrical surface and an outer member receiving the inner member. The outer member has an inner cylindrical surface and the outer member rotates relative to the inner member.

Inner magnets are disposed in the outer surface and distributed regularly and peripherally around the outer surface. The inner magnets have radially oriented magnetic poles, and alternate adjacent ones of said inner magnets have alternate radially outwardly directed north and south poles. Outer magnets are disposed in the inner surface and distributed regularly and peripherally around the inner surface. The outer magnets have radially oriented magnetic poles, and alternate adjacent ones of the outer magnets have alternate radially inwardly directed north and south poles. As the inner and outer members are rotated with respect to each other, the inner and outer magnets generate opposing and attracting forces each other to form a plurality of magnetic detent positions. A magnetic field sensor generates a signal in response to relative rotation of the inner and outer members.

DETAILED DESCRIPTION

Figure 1:
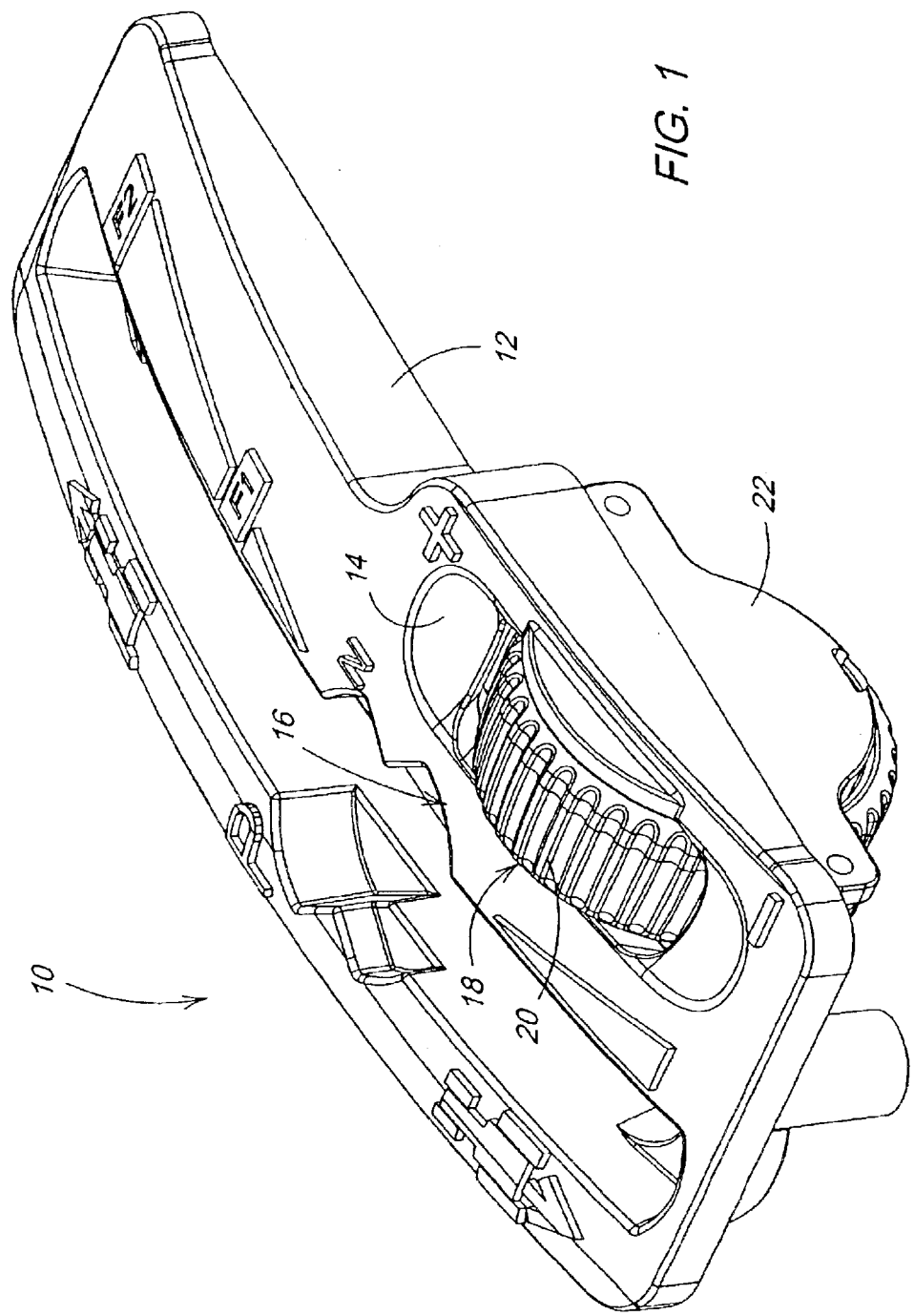
FIG. 1 is a perspective view of a rotary multi-position magnetic detent device according to the present invention.

Referring to FIG. 1, an operator control assembly 10 includes a housing 12 with an aperture 14 for receiving an operator manipulatable rotary multi-position magnetic detent device 16. Device 16 includes a hollow cylindrical outer rotary member 18 with a ribbed outer surface 20 to function as a thumbwheel. Device 16 also includes an inner member 22 which is attached to the housing 12. Control assembly 10 may be used as a control for a vehicle transmission (not shown).

Figure 2:
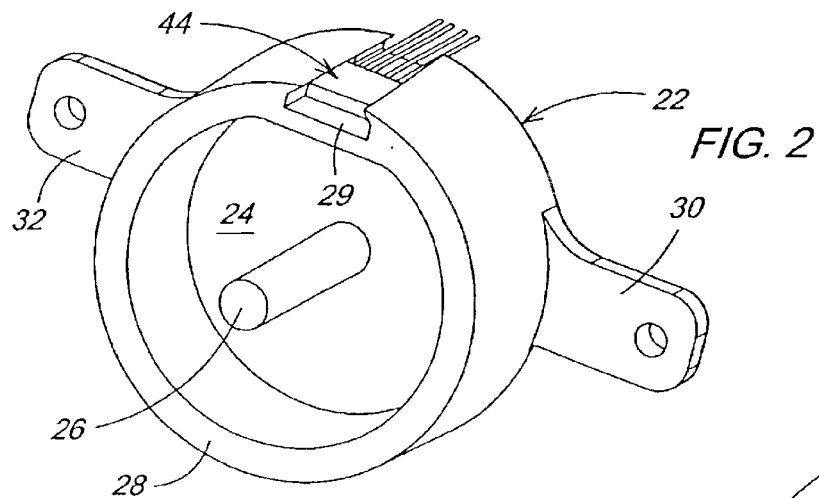
FIG. 2 is a perspective view of an outer member of the present invention.

As best seen in FIG. 2, inner member 22 has a circular disk 24 from which projects a central pin 26. A hollow cylindrical rim member 28 projects axially from the outer periphery of disk 24. A slot 29 is formed in the rim member 28 for receiving a conventional commercially available Hall effect magnetic sensor 44. A pair of mounting tabs 30, 32 project radially from opposite sides of the rim member 28 for attaching member 22 to the housing 12.

Figure 3:
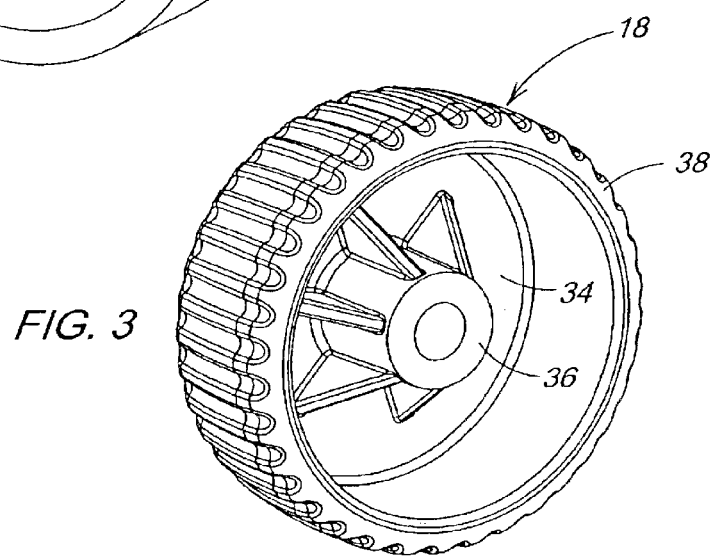
FIG. 3 is a perspective view of an inner member of the present invention.

As best seen in FIG. 3, outer member 18 has a circular disk 34 from which projects a hollow central hub 36 which rotatably receives pin 26. A hollow cylindrical rim member 38 projects axially from the outer periphery of disk 34.

Figure 4:
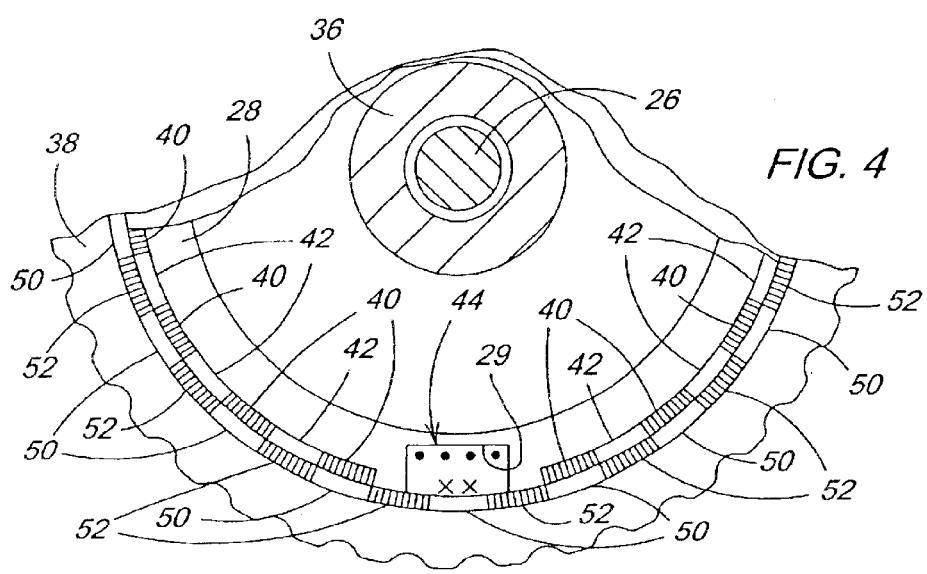
FIG. 4 is sectional assembly view of the present invention.

Referring now to FIG. 4, a plurality of inner magnets 40, 42 is disposed in the outer surface of rim member 28 and distributed regularly and peripherally around the outer surface of rim member 28. Inner magnets 40 and 42 have radially oriented magnetic poles. Magnets 40 have radially outwardly directed north poles, while alternately positioned and adjacent inner magnets 42 have outwardly directed south poles.

Also referring now to FIG. 4, a plurality of outer magnets 50, 52 is disposed in the inner surface of rim member 38 and distributed regularly and peripherally around this inner surface. Outer magnets 50 and 52 have radially oriented magnetic poles. Magnets 50 have radially outwardly directed north poles, while alternately positioned and adjacent magnets 52 have outwardly directed south poles. The inner and outer rim members 28 and 38 are dimensioned so that there is only a small radial gap between the inner magnets 40, 42 and the outer magnets 50, 52. The magnets 40, 42, 50 and 52 are preferable formed integrally with their respective rim members using a commercial injection molded magnet forming process, as available from the Plastiform Division of the Arnold Engineering Co.

As the outer rim 38 is rotated with respect to the inner rim 28, the sensor 44 generates a signal indicative of the rotary position and speed of the outer rim 38. When magnets 50 are aligned with magnets 40 and magnets 52 are aligned with magnets 42 there is an attractive magnetic force between each outer magnet and each corresponding inner magnet. When magnets 50 are aligned with magnets 42 and magnets 52 are aligned with magnets 40 there is an opposing magnetic force between each outer magnet and each corresponding inner magnet. As a result, as outer rim 38 is rotated with respect to inner rim 28 the outer rim 38 is subjected to alternating attracting and opposing magnetic forces, thus creating a plurality of angularly spaced apart magnetic detent positions of the outer rim 38.

The total number of magnets 40, 42, 50 and 52 can be varied to achieve more or less angular resolution. Preferably, the angular spacing between the inner magnets 40 and 42 is the same as the angular spacing between outer magnets 50 and 52 so that all the inner N poles can directly face a corresponding outer N or S pole. This maximizes the amount or amplitude of the attracting and opposing forces and maximizes the strength of the detent effect. Different relative angular spacings can be used to achieve a different detent feel.

Hall effect magnetic sensor 44 may be a dual output Hall effect device with a set of 4 lines 46, including a pair of output signal lines, such as an Allegro A3425 or Melexis 90224. Such a sensor will generate quadrature signals on the output signal lines in response to movement of the outer magnets 50, 52 relative to the inner magnets 40, 42. Rotation of the outer magnets by one detent position produces two signal transitions on each output line. Because this resolution is 4 times the detent resolution, minute oscillations across one magnetic switching point can be prevented from causing the output signal from sensor 44 from indicating a position change of the outer magnets 50, 52.

Device 16 may be used as an input control device, such as a set speed input device, in a control system (not shown) for an infinitely variable transmission (not shown) in a vehicle such as an agricultural tractor (not shown). Such a control system could be programmed to require that the device 16 generate a particular sequence of signals before the set speed is incremented or decremented. For example, the control system could require at least two proper signal transitions before the set speed is adjusted, so that slight mechanical motion cannot cause a dithering electrical output to the controlled system. This rotary detent device with magnetically generated detents does not require phase adjustment, at installation or over the life of the mechanism. Dithering can be prevented and the detents do not wear, since there is no mechanical contact in the detent.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A rotary magnetic detent device comprising:
an inner member having a first rim;
a plurality of inner magnets disposed in the first rim and distributed regularly and peripherally around said first rim, the inner magnets having radially oriented north and south magnetic poles, and alternate adjacent ones of said inner magnets having alternate radially outwardly directed north and south poles;
an outer member receiving the inner member, said members being rotatable relative to each other, the outer member having a second rim which receives the first rim;
a plurality of outer magnets disposed in the second rim and distributed regularly and peripherally around said second rim, the outer magnets having radially oriented north and south magnetic poles, and alternate adjacent ones of said outer magnets having alternate radially inwardly directed north and south poles, the inner and outer magnets opposing and attracting each other to form a plurality of detent positions as the inner and outer members are rotated with respect to each other; and
a magnetic field sensor which generates a signal in response to relative rotation of the inner and outer members.

2. The rotary magnetic detent device of claim 1, wherein: the inner magnets have a first angular spacing therebetween, and the outer magnets have a second angular spacing therebetween.

3. The rotary magnetic detent device of claim 2, wherein: the first angular spacing is the same as the second angular spacing.

4. The rotary magnetic detent device of claim 2, wherein: the inner magnets have a first angular spacing therebetween, and the outer magnets have a second angular spacing therebetween, the first angular spacing being the same as the second angular spacing so that when the inner magnets having outwardly oriented north poles are adjacent to the outer magnets having inwardly oriented south poles, the inner magnets having outwardly oriented south poles are adjacent to the outer magnets having inwardly oriented north poles.

5. The rotary magnetic detent device of claim 2, wherein: the inner magnets have a first angular spacing therebetween, and the outer magnets have a second angular spacing therebetween, the first angular spacing being the same as the second angular spacing so that when the inner magnets having outwardly oriented north poles are adjacent to the outer magnets having inwardly oriented north poles, the inner magnets having outwardly oriented south poles are adjacent to the outer magnets having inwardly oriented south poles.

6. The rotary magnetic detent device of claim 1, wherein: a slot is formed in one of the first and second rims; and the magnetic field sensor is received in said slot.

7. The rotary magnetic detent device of claim 1, wherein: a slot is formed in an outer surface of the first rim; and the magnetic field sensor is received in said slot.

8. The rotary magnetic detent device of claim 1, wherein: the outer member has an outer peripheral surface which forms a thumbwheel surface for manipulation by an operator.

9. A rotary magnetic detent device comprising:
an inner member;
an outer member receiving the inner member, said members being rotatable relative to each other;
a plurality of inner magnets distributed regularly and peripherally around the inner member, the inner magnets having radially oriented north and south magnetic poles, and alternate adjacent ones of said inner magnets having alternate radially outwardly directed north and south poles;
a plurality of outer magnets distributed regularly on said outer member, the outer magnets having radially oriented north and south magnetic poles, and alternate adjacent ones of said outer magnets having alternate radially inwardly directed north and south poles, the inner and outer magnets opposing and attracting each other to form a plurality of detent positions as the inner and outer members are rotated with respect to each other; and
a magnetic field sensor which generates a signal in response to relative rotation of the inner and outer members.

10. The rotary magnetic detent device of claim 9, wherein: a slot is formed in one of the inner and outer members; and the magnetic field sensor is received in said slot.

11. The rotary magnetic detent device of claim 9, wherein: a slot is formed in an outer surface of the inner member; and the magnetic field sensor is received in said slot.

12. The rotary magnetic detent device of claim 9, wherein: the outer member has an outer peripheral surface which forms a thumbwheel surface for manipulation by an operator.

* * * * *